United States Patent
Wigren et al.

(10) Patent No.: US 11,956,727 B2
(45) Date of Patent: Apr. 9, 2024

(54) COORDINATING CONTROL OF AVERAGE EIRP OF MULTIPLE RADIO TRANSMITTERS

(71) Applicant: Telefonaktiebolaget LM Ericsson (publ), Stockholm (SE)

(72) Inventors: Torbjörn Wigren, Uppsala (SE); Billy Hogan, Sollentuna (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 157 days.

(21) Appl. No.: 17/607,206

(22) PCT Filed: Apr. 30, 2019

(86) PCT No.: PCT/SE2019/050385
§ 371 (c)(1),
(2) Date: Oct. 28, 2021

(87) PCT Pub. No.: WO2020/222682
PCT Pub. Date: Nov. 5, 2020

(65) Prior Publication Data
US 2022/0225238 A1 Jul. 14, 2022

(51) Int. Cl.
*H04W 52/12* (2009.01)
*H04W 52/36* (2009.01)

(52) U.S. Cl.
CPC ......... *H04W 52/12* (2013.01); *H04W 52/367* (2013.01)

(58) Field of Classification Search
CPC ... H04W 52/12; H04W 52/367; H04W 52/40; H04W 52/42
See application file for complete search history.

(56) References Cited

U.S. PATENT DOCUMENTS

| 2007/0046539 A1* | 3/2007 | Mani | H04B 7/0691 |
| | | | 342/383 |
| 2008/0311865 A1* | 12/2008 | Worfolk | H04W 52/225 |
| | | | 370/336 |

FOREIGN PATENT DOCUMENTS

| CN | 101427479 A | 5/2009 |
| CN | 101868019 A | 10/2010 |
| CN | 102804831 A | 11/2012 |
| CN | 103582101 A | 2/2014 |

(Continued)

*Primary Examiner* — Yuwen Pan
*Assistant Examiner* — Angelica Perez
(74) *Attorney, Agent, or Firm* — Murphy, Bialk & Homiller, PLLC

(57) ABSTRACT

There is provided mechanisms for average EIRP control of at least two radio power sources. A method is performed by a coordinating controller of a site. The site comprises the at least two radio power sources. The method comprises obtaining, from a respective inner controller of each of the at least two radio power sources, power control feedback information. The method comprises determining, according to an inner control loop for each of the at least two radio power sources, coordinating control information from the power control feedback information. The method comprises performing individual average power control of each of the at least two radio power sources by providing, to each respective inner controller, the coordinating control information, whereby total average transmission power of each of the at least two radio power sources is selectively adjusted based on the inner control loop.

16 Claims, 11 Drawing Sheets

(56) References Cited

FOREIGN PATENT DOCUMENTS

| | | |
|---|---|---|
| CN | 104919716 A | 9/2015 |
| WO | 2015024140 A1 | 2/2015 |
| WO | 2018067043 A1 | 4/2018 |
| WO | WO-2018067043 A1 * | 4/2018 ........... H04B 17/102 |

* cited by examiner

COORDINATING CONTROL OF AVERAGE EIRP OF MULTIPLE RADIO TRANSMITTERS

TECHNICAL FIELD

Embodiments presented herein relate to methods, a coordinating controller, inner controllers, computer programs, and a computer program product for average power control of radio power sources.

BACKGROUND

When any radio equipment is to be deployed, regulatory radio frequency (RF) electromagnetic field (EMF) exposure requirements should be accounted for. These RF EMF exposure regulations may typically be based on the guidelines from the International Commission on Non-Ionizing Radiation Protection (ICNIRP) but may take different forms in some countries and regions. The aim of RF EMF exposure regulations is to ensure that human exposure to RF energy is kept within prescribed limits, which typically have been set with wide safety margins.

Some newly developed base stations and other radio equipment are equipped with so-called advanced antenna systems (AAS). These antenna systems increase the capacity and/or coverage compared to traditionally used antenna system by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS systems with a large number of antenna elements in order to achieve a high directivity, there may be a large maximum beamforming gain. A consequence of a large beamforming gain is typically that the radiated power is concentrated in directional beams, meaning that the Equivalent Isotropic Radiated Power (EIRP) rating of the base station, i.e. the power radiated from an antenna with unity antenna gain in all directions, is increased as compared to the situation without AAS systems.

The RF EMF exposure limitations are typically expressed in terms of power density (in units of $W/m^2$) which in the far field is proportional to the EIRP. Consequently, the EIRP can be used to determine the power density in the far field.

The ICNIRP and other RF EMF exposure limitations are usually expressed in terms of average power densities over a specified averaging time interval T. This means that the momentary power density can be higher during a shorter time than T, however the time-averaged power density over any time period T must be below the specified limit. To maintain a certain RF EMF compliance boundary or exclusion zone, that is smaller than what is obtained using the maximum EIRP of the AAS, the time-averaged total transmit power needs to be controlled to be less than an average power threshold that is computed based on the RF exposure limitations and the selected exclusion zone. In cases where more than one power source share the same AAS or where several AASs are co-sited and aligned, the threshold may have to be computed in terms of the combined EIRP of the site.

Hence, there may be a need for efficient control of the average EIRP for base stations and other radio equipment.

SUMMARY

An object of embodiments herein is to provide efficient control of radio power sources of base stations and other radio equipment, so that RF EMF exclusion zones are maintained by the controlled time-averaged powers of the base stations and radio equipment.

This objective is generally solved by mechanisms performed by a coordinating controller for controlling the combined average EIRP of the power sources.

According to a first aspect there is presented a method for average EIRP control of at least two radio power sources. The method is performed by a coordinating controller of a site. The site comprises the at least two radio power sources. The method comprises obtaining, from a respective inner controller of each of the at least two radio power sources, power control feedback information. The method comprises determining, according to an inner control loop for each of the at least two radio power sources, coordinating control information from the power control feedback information. The method comprises performing individual average power control of each of the at least two radio power sources by providing, to each respective inner controller, the coordinating control information, whereby total average transmission power of each of the at least two radio power sources is selectively adjusted based on the inner control loop.

According to a second aspect there is presented a coordinating controller of a site for average EIRP control of at least two radio power sources. The site comprises the at least two radio power sources. The coordinating controller comprises processing circuitry. The processing circuitry is configured to cause the coordinating controller to obtain, from a respective inner controller of each of the at least two radio power sources, power control feedback information. The processing circuitry is configured to cause the coordinating controller to determine, according to an inner control loop for each of the at least two radio power sources, coordinating control information from the power control feedback information. The processing circuitry is configured to cause the coordinating controller to perform individual average power control of each of the at least two radio power sources by providing, to each respective inner controller, the coordinating control information, whereby total average transmission power of each of the at least two radio power sources is selectively adjusted based on the inner control loop.

According to a third aspect there is presented a coordinating controller of a site for average EIRP control of at least two radio power sources. The site comprises the at least two radio power sources. The coordinating controller comprises an obtain module configured to obtain, from a respective inner controller of each of the at least two radio power sources, power control feedback information. The coordinating controller comprises a determine module configured to determine, according to an inner control loop for each of the at least two radio power sources, coordinating control information from the power control feedback information. The coordinating controller comprises a control module configured to perform individual average power control of each of the at least two radio power sources by providing, to each respective inner controller, the coordinating control information, whereby total average transmission power of each of the at least two radio power sources is selectively adjusted based on the inner control loop.

According to a fourth aspect there is presented a computer program for average EIRP control of at least two radio power sources. The computer program comprises computer program code which, when run on processing circuitry of a coordinating controller, causes the coordinating controller to perform a method according to the first aspect.

The objective is generally further solved by mechanisms performed by an inner controller for controlling the average power a radio power source.

According to a fifth aspect there is presented a method for average power control of a radio power source. The method is performed by an inner controller of the radio power source. The method comprises providing power control feedback information of the radio power source to a coordinating controller of a site. The site comprises the radio power source and at least one further radio power source. The method comprises obtaining coordinating control information from a coordinating controller, the coordinating control information is determined according to a respective inner control loop for each of the radio power source and the at least one further radio power source from the power control feedback information. The method comprises performing average power control of the radio power source according to the coordinating control information whereby total average transmission power of the radio power source is selectively adjusted based on the inner control loop.

According to a sixth aspect there is presented an inner controller of a radio power source for average power control of the radio power source. The inner controller comprises processing circuitry. The processing circuitry is configured to cause the inner controller to provide power control feedback information of the radio power source to a coordinating controller of a site. The site comprises the radio power source and at least one further radio power source. The processing circuitry is configured to cause the inner controller to obtain coordinating control information from a coordinating controller, the coordinating control information is determined according to a respective inner control loop for each of the radio power source and the at least one further radio power source from the power control feedback information. The processing circuitry is configured to cause the inner controller to perform average power control of the radio power source according to the coordinating control information whereby total average transmission power of the radio power source is selectively adjusted based on the inner control loop.

According to a seventh aspect there is presented an inner controller of a radio power source for average power control of the radio power source. The inner controller comprises a provide module configured to provide power control feedback information of the radio power source to a coordinating controller of a site. The site comprises the radio power source and at least one further radio power source. The inner controller comprises an obtain module configured to obtain coordinating control information from a coordinating controller, the coordinating control information is determined according to a respective inner control loop for each of the radio power source and the at least one further radio power source from the power control feedback information. The inner controller comprises a control module configured to perform average power control of the radio power source according to the coordinating control information whereby total average transmission power of the radio power source is selectively adjusted based on the inner control loop.

According to an eight aspect there is presented a computer program for average power control of a radio power source, the computer program comprising computer program code which, when run on processing circuitry of an inner controller, causes the inner controller to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these coordinating controllers, these inner controllers, these computer programs, and this computer program product enable efficient average power and EIRP control of radio power sources.

Advantageously these methods, these coordinating controllers, these inner controllers, these computer programs, and this computer program product improves stability of the inner control loop.

Advantageously these methods, these coordinating controllers, these inner controllers, these computer programs, and this computer program product enable uniform behavior of the inner control loop for different radio power sources.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
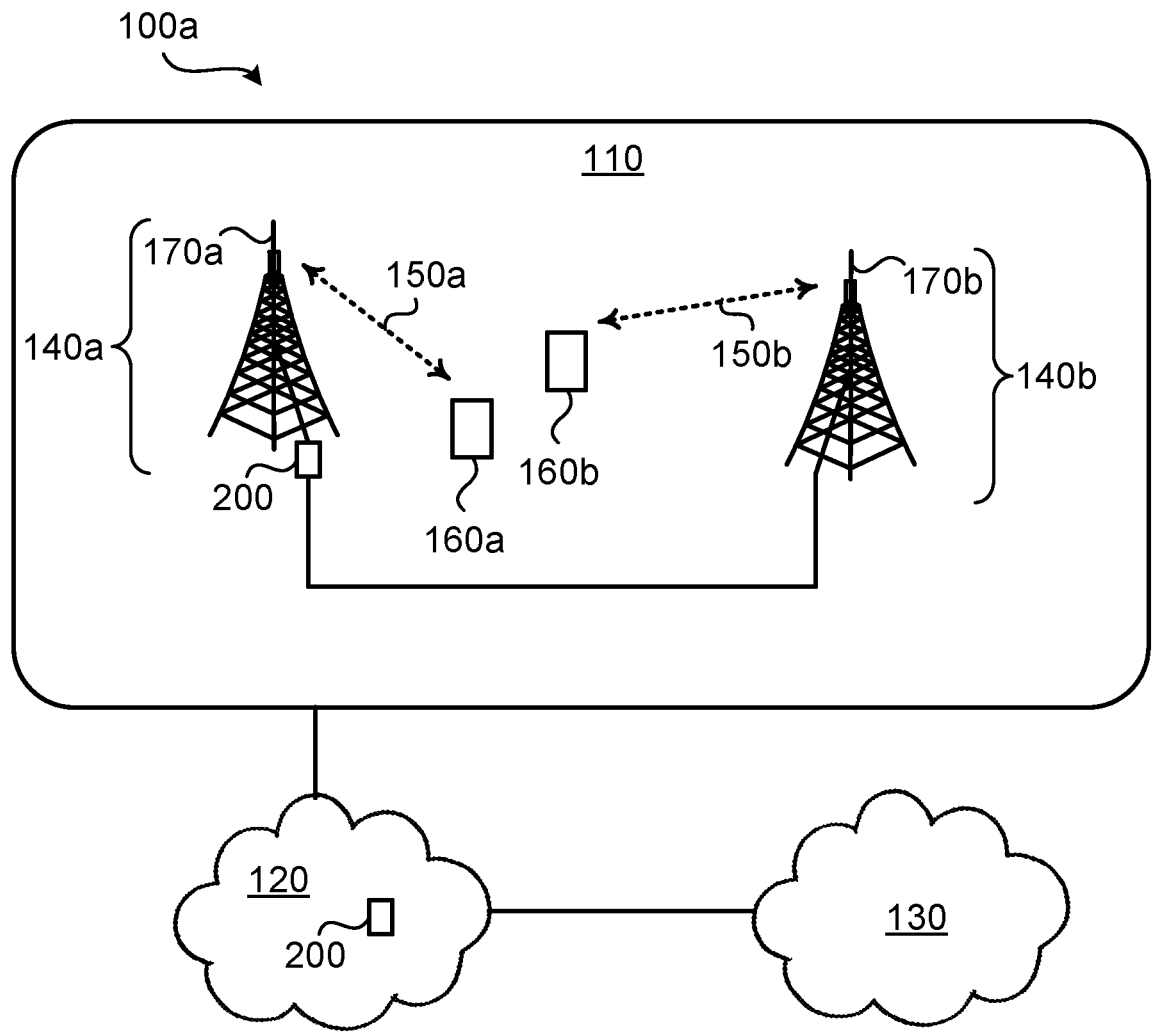
FIGS. 1 and 2 are schematic diagrams illustrating communication networks according to embodiments.
Figure 2:
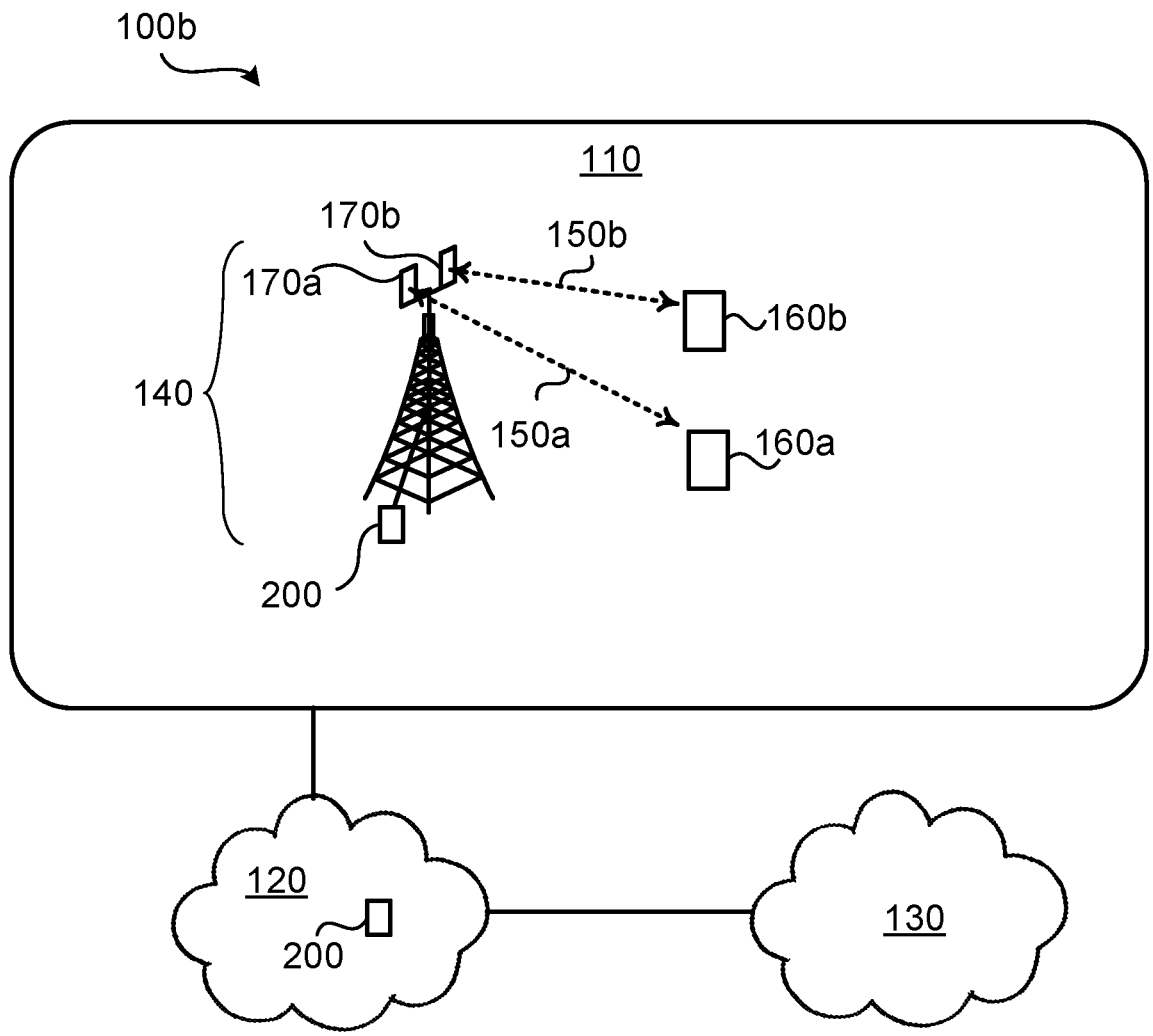

FIG. 1 and FIG. 2 are schematic diagrams illustrating communications networks 100a, 100b where embodiments presented herein can be applied. The communications networks 100a, 100b could be a third generation (3G) telecommunications network, a fourth generation (4G) telecommunications network, or a fifth (5G) telecommunications network, or any combination thereof, and support any 3GPP telecommunications standard, where applicable.

The communications networks 100a, 100b comprise a coordinating controller 200 configured to control a radio power source 170a, 170b of a site 140, 140a, 140b that provides network access to at least one terminal device 160a, 160b in a radio access network 110, thus enabling the terminal device 160a, 160b to communicate over a wireless link 150a, 150b. The radio access network 110 is operatively connected to a core network 120. The core network 120 is in turn operatively connected to a service network 130, such as the Internet. The terminal device 160a, 160b is thereby enabled to, via the site 140, 140a, 140b, access services of, and exchange data with, the service network 130.

Examples of sites 140, 140a, 140b are radio base stations, radio access network nodes, base transceiver stations, Node Bs (NBs), evolved Node Bs (eNBs), gNBs, access points, and access nodes, and backhaul nodes. Examples of terminal devices 160a, 160b are wireless devices, mobile stations, mobile phones, handsets, wireless local loop phones, user equipment (UE), smartphones, laptop computers, tablet computers, network equipped sensors, network equipped vehicles, and so-called Internet of Things devices.

A coordinating controller 200 might comprise, be collocated with, integrated with, or be in operational communications with, the site 140, 140a, 140b. The site 140, 140a, 140b might be configured for dual connectivity and/or carrier aggregation.

In general terms, according to dual connectivity (or more generally, multi connectivity) a terminal device 160a, 160b might may simultaneously receive and transmit to at least two different sites, such as sites 140a and 140b. The two sites are sometimes denoted as Master eNB (MeNB) and Secondary eNB (SeNB). According to an example of the split bearer architecture option of dual connectivity, in the downlink, data is split on the Packet Data Convergence Protocol (PDCP) layer in the MeNB. The site may route PDCP protocol data units (PDUs) dynamically via the radio link control (RLC) protocol at the MeNB directly to the terminal device 160a, 160b, or via a backhaul channel to the SeNB and then via the RLC protocol at the SeNB to the terminal device 160a, 160b. The data flow from MeNB to SeNB via the backhaul channel is typically controlled by a flow control protocol in order to balance the SeNB buffer fill state. As the skilled person understands, the MeNB could use a first radio access technology (RAT) whilst the SeNB could use a second RAT. In other scenarios the MeNB and the SeNB both use the same RAT.

In general terms, according to carrier aggregation a terminal device 160a, 160b might simultaneously receive and transmit on at least two different carriers while using a common PDCP, RLC and medium access control (MAC) layer for the carriers but a separate physical layer for each carrier. The site 140, 140a, 140b selects the radio resources, modulation, coding and MIMO layers to use on each carrier and schedule MAC PDUs on the carriers based on this selection and on feedback from the terminal device 160a, 160b. This is in general referred to as scheduling. The carriers are synchronized in time. This implies that a common controller of the site 140, 140a, 140b can coordinate and control the use of each carrier per transmission time interval (TTI). Each carrier is also associated with a cell as resource owner.

Dual connectivity and carrier aggregation can be combined. For example, when more than one RAT, such as LTE and NR, are combined at a site 140, 140a, 140b, dual connectivity can be used such that one leg of the dual connectivity is used for LTE whilst another leg is used for NR. In such a situation carrier aggregation groups of terminal devices on one RAT might be used on each of the legs of the dual connectivity.

As mentioned above there is a need for efficient control of the average EIRP for base stations and other radio equipment, in particular when co-sited.

For example, assume a scenario where multiple carriers in single site 140, or co-sited sites 140a, 140b possibly using different RATs, are transmitting over the same geographical region, like a cell. For simplicity, antenna array sharing is assumed. Assume for simplicity that each site 140, 140a, 140b provides power to their antenna arrays independently. Assume further that each site has an inner controller 300 that implements functionality for single node average power control. The inner control loop of each radio power source 170a, 170b might be supervised by the inner controller 300 in each radio power source 170a, 170b whereas the average EIRP control of the radio power sources 170a, 170b is collectively and individually controlled by the coordinating controller 200 by providing coordinating control information to the inner controllers 300.

The embodiments disclosed herein in particular relate to mechanisms for average EIRP control of radio power sources 170a, 170b. In order to obtain such mechanisms there is provided a coordinating controller 200, a method performed by the coordinating controller 200, a computer program product comprising code, for example in the form of a computer program, that when run on processing circuitry of the coordinating controller 200, causes the coordinating controller 200 to perform the method. In order to obtain such mechanisms there is further provided an inner controller 300, a method performed by the inner controller 300, and a computer program product comprising code, for example in the form of a computer program, that when run on processing circuitry of the inner controller 300, causes the inner controller 300 to perform the method.

Figure 3:
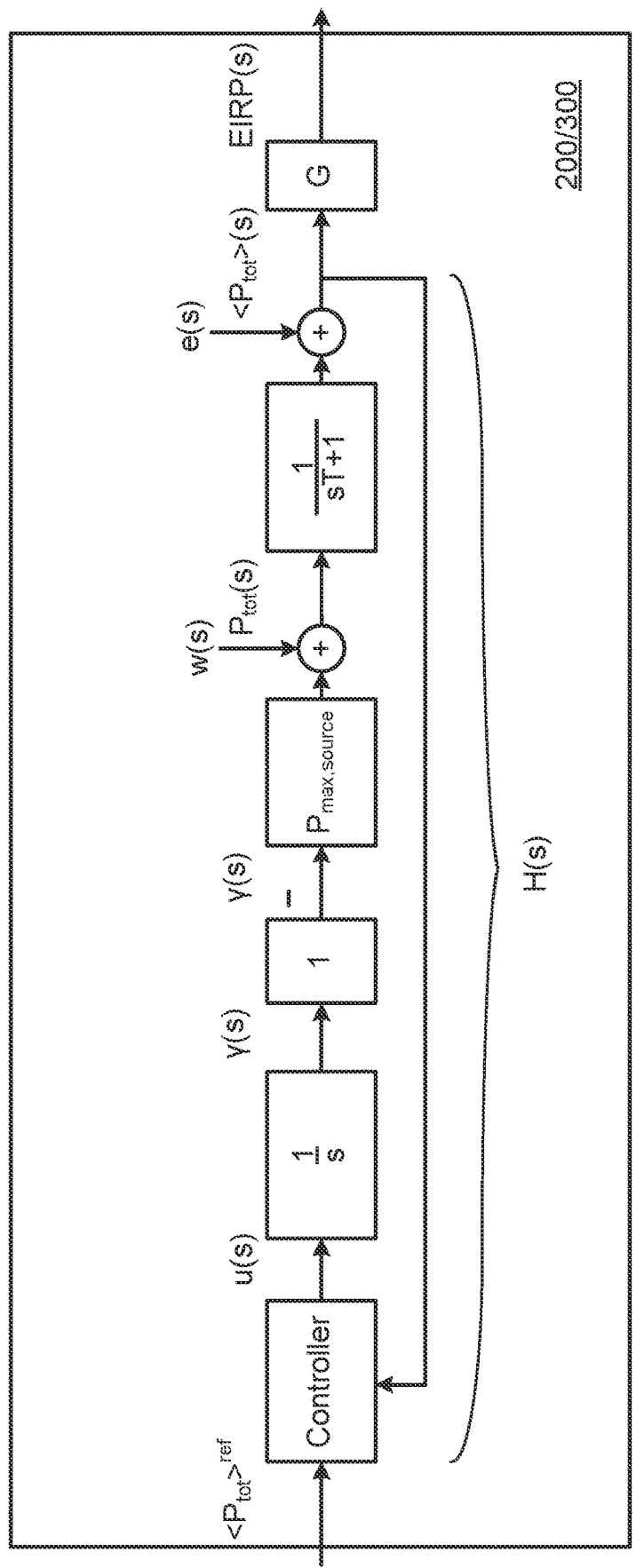
FIGS. 3, 6, 7 are block diagrams of controllers according to embodiments.

FIG. 3 is a block diagram of the control node 200 where feedback control has been enabled by a feedback control loop, in this disclosure denoted a back-off power control loop. In FIG. 3, $\langle P_{tot} \rangle^{ref}$ denotes the setpoint for the averaged power (typically slightly less than the computed threshold value for the averaged power), 1/s denotes the actuator dynamics with lower and upper limits inactive, $\bar{\gamma}(t)$ denotes the scheduler limitation after lower and upper limitation (inactive in FIG. 3), $P_{max,source}$ denotes the maximal momentary total power of the power source, w(t) denotes a disturbance representing predicted power errors, 1/(sT+1) represents an autoregressive simplified model of the averaging, $\langle P_{tot} \rangle$(s) denotes the averaged total power, e(s) denotes a measurement disturbance, G denotes the antenna gain and EIRP (s) denotes the EIRP. All quantities are in FIG. 3 expressed in the Laplace transform domain, which is allowed since the feedback control mechanism design is performed with constraints inactive.

In some aspects the controller block is given by:

$$u(s)=CT(1+T_Ds)(\langle P_{tot}\rangle^{ref} - \langle P_{tot}\rangle(s)).$$

Here, u(s) is the control signal. A controller implementing this controller block is of proportional-derivative (PD) type. C denotes the proportional gain, and $T_D$ the differentiation time. To implement the feedback control mechanism, $\langle P_{tot}\rangle^{ref}$, $\langle P_{tot}\rangle$ (t) and $\langle \dot{P}_{tot}\rangle$ (t) are needed. The first two quantities can be obtained by configuration and averaging of measured spectral density's by C, while the second quantity needs to be estimated. This can e.g. be achieved by autoregressive filtering of $\langle P_{tot}\rangle$ (t) with the filter:

$$\langle \dot{P}_{tot}\rangle(s) = \frac{\alpha s}{s+\alpha}\langle P_{tot}\rangle(s),$$

where α is a filter parameter.

In order to further emphasize the back-off control performance it could be advisable to only allow differential control action that reduces the scheduler threshold γ(t), meaning that only negative contributions from the second term of the feedback mechanism should be allowed. This means that in the time domain, the following restriction to the derivative $\langle \dot{P}_{tot}\rangle$ (t) might be applied:

$$u(t)=CT(\langle P_{tot}\rangle^{ref} - \langle P_{tot}\rangle(t)) - CTT_D \max(0,\langle \dot{P}_{tot}\rangle(t)).$$

It might occur that the feedback control mechanism is not fast enough to prevent a small overshoot of the threshold value. To prevent this from occurring, a hard back-off might be superimposed over the herein disclosed feedback control mechanism. In some aspects this hard back-off operates by setting the scheduler threshold γ(t) to its minimum value $\gamma_{low}$ whenever the following holds:

$$\langle P_{tot}\rangle(t) > \text{margin} \cdot \text{EIRP}_{threshold}$$

where margin is a value slightly below 1 and where $\text{EIRP}_{threshold}$ is the maximum averaged EIRP threshold determined to meet a regulatory RF EMF exposure requirement. Further aspects of the scheduler threshold γ(t) will be disclosed below.

In some aspects there is one control signal $u_i(s)$, i=1, ..., n, for each of then radio power sources and hence the index i can be appended to any relevant quantities, such as $\langle P_{tot,i}\rangle^{ref}$, $\langle P_{tot,i}\rangle$ (t) and $\langle \dot{P}_{tot,i}\rangle$ (t), etc.

Figure 4:
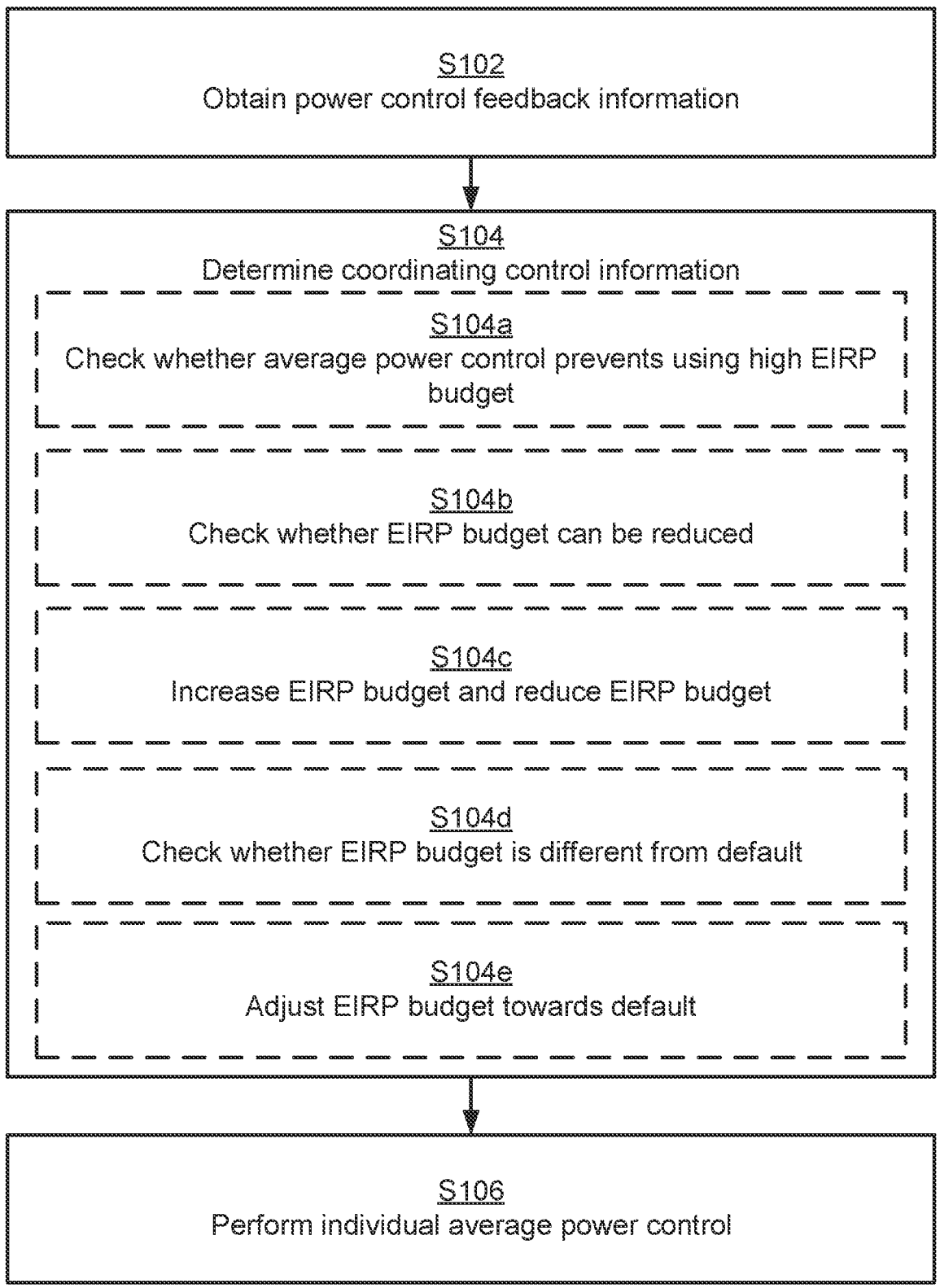
FIGS. 4 and 5 are flowcharts of methods according to embodiments.

Reference is now made to FIG. 4 illustrating a method for EIRP control of at least two radio power sources 170a, 170b as performed by the coordinating controller 200 of a site 140, 140a, 140b, the site 140, 140a, 140 comprising the at least two radio power sources 170a, 170b according to an embodiment.

The control of the at least two radio power sources 170a, 170b as performed by the coordinating controller 200 is based on information from the at least two radio power sources 170a, 170b as provided by the inner controllers 300. Hence the coordinating controller 200 is configured to perform step S102:

S102: The coordinating controller 200 obtains, from a respective inner controller 300 of each of the at least two radio power sources 170a, 170b, power control feedback information.

Examples of power control feedback information will be disclosed below.

The control of the at least two radio power sources 170a, 170b is then determined according to an inner control loop. Particularly, the coordinating controller 200 is configured to perform step S104:

S104: The coordinating controller 200 determines, according to an inner control loop for each of the at least two radio power sources 170a, 170b, coordinating control information from the power control feedback information.

Examples of coordinating control information and of how the coordinating control information can be determined will be disclosed below.

Individual average power control of each of the at least two radio power sources 170a, 170b is then performed. Particularly, the coordinating controller 200 is configured to perform step S106:

S106: The coordinating controller 200 performs individual average power control of each of the at least two radio power sources 170a, 170b by providing, to each respective inner controller 300, the coordinating control information, whereby total average transmission power $\langle P_{tot,i}\rangle$ (s) of each of the at least two radio power sources 170a, 170b is selectively adjusted based on the inner control loop.

Embodiments relating to further details of average EIRP control of at least two radio power sources 170a, 170b as performed by the coordinating controller 200 will now be disclosed.

There could be different ways in which the coordinating controller 200 determines the coordinating control information from the power control feedback information. According to an embodiment the coordinating control information is determined using a dynamic input-output relation. In one example the dynamic input-output relation at a given time t is given by:

$$\begin{cases} \dot{x} = f(x, a) \\ b = g(x) \end{cases},$$

where f and g are vector-valued functions, where a represent a value of the power control feedback information, where b represents a value of the coordinating control information, and where x is an internal state of the coordinating controller 200.

There could be different parameters to which the average EIRP control pertains. In some aspects the inner controller 300 is responsible for setting transmission power for at least one of: a carrier, a node, a cell, a base station, or a RAT. That is, according to an embodiment the individual average power control of each of the at least two radio power sources 170a, 170b pertains to transmission power for an individual carrier, node, cell, base station, or radio access technology of each radio power source 170a, 170b.

Further aspects of the power control feedback information and the coordinating control information will now be disclosed.

According to an embodiment, the coordinating control information specifies a respective reference value for time average transmission power for each of the at least two radio power sources 170a, 170b.

According to a first example the power control feedback information is given as a value of momentary transmission power $P_{tot,i}(s)$ of each of the at least two radio power sources 170a, 170b.

According to a second example the power control feedback information is given as a value of the total average transmission power $\langle P_{tot,i} \rangle$ (s) of each of the at least two radio power sources 170a, 170b.

According to a third example the power control feedback information is given as a time fraction value, denoted an activity factor, representing how long the inner controller 300 of each of the at least two radio power sources 170a, 170b is active within a given time frame. The activity factor might thus represent the fraction of the time each inner controller 300 is activated.

There could be different protocol layers on which the power control feedback information is obtained. There could also be different protocol layers on which the coordinating control information is provided. According to a first embodiment the power control feedback information is obtained at the MAC protocol layer and the coordinating control information is provided at the MAC protocol layer. According to a second embodiment, the power control feedback information is obtained at the physical (PHY) protocol layer and the coordinating control information is provided at the PHY protocol layer.

In some aspects the control signals $u_i(s)$ are computed by the coordinating controller 200 directly, thereby affecting the dynamic actuator thresholds $\gamma_i(s)$ directly. That is, according to an embodiment, the coordinating control information is given as a direct control signal $u_i(s)$ for each of the at least two radio power sources 170a, 170b. The power control feedback information needed by the coordinating controller 200 would be either the momentary powers $P_{tot,i}(s)$ or the corresponding averages $\langle P_{tot,i} \rangle$ (s), depending on whether the averaging block is located in the coordinating controller 200 or in the respective inner controllers 300.

In some aspects the coordinating controller 200 rather computes time varying reference values to the respective inner controllers 300, i.e. the signals $\langle P_{tot,i} \rangle^{ref}(s)$, $i=1, \ldots, n$, are computed by the coordinating controller 200. That is, according to an embodiment, the coordinating control information is given as a reference value $\langle P_{tot,i} \rangle^{ref}(S)$ of time-varying transmission power for each of the at least two radio power sources 170a, 170b. The power control feedback information needed by the coordinating controller 200 would still be either the momentary powers $P_{tot,i}(s)$ or the corresponding averages $\langle P_{tot,i} \rangle$ (s), depending on whether the averaging block is located in the coordinating controller 200 or in the respective inner controllers 300. Alternatively, the power control feedback information might be the activity factor of each inner controller 300, for example measured as the fraction of the time each inner controller 300 is activated. Still another possibility is to use the amount of momentary or averaged incoming traffic at each site 140, 140a, 140b.

In some aspects certain carriers in one or more of the sites 140, 140a, moa are dedicated or prioritized, to carry out tasks that are more important than tasks handled by other carriers. Non-limiting examples include, but are not limited to, random access and other key functionalities for enabling a terminal device 160a, 160b to maintain an operational connection to the network. Prioritization might also occur between co-sited sites 140a, 140b using different RATs. It might for example be the case that it is desired to promote terminal devices using NR over terminal devices using LTE, or vice versa. Hence, according to an embodiment, the power control feedback information obtained from at least one of the inner controllers 300 comprises priority information p(i), and the coordinating control information is determined based on the priority information p(i).

In further detail, assume that each radio power source 170a, 170b (defined by a site 140, 140a, 140b or a carrier) are given a priority order, defined by the set $\{p(i)\}_{i=1}^{n}$, where p(i) is the priority of radio power source i, for $i=1, \ldots, n$.

Each radio power source 170a, 170b is associated with parameters and thresholds like e.g. $P_{max,source,i}$, $P_{max,regulatory,i}$, $\langle P_{tot,i} \rangle^{ref}$, $\delta_{1,i}$, $\delta_{2,i}$, and $margin_i$, for $i=1, \ldots, n$. These parameters and thresholds are all given initial values, as are all other quantities of the inner control loop. The above notation is as follows: $P_{max,source,i}$ denotes the maximum power of radio power source i, $P_{max,regulatory,i}$ denotes that maximum threshold set for radio power source i when defining the exclusion zone, $\langle P_{tot,i} \rangle^{ref}$ denotes the reference value of backoff power control loop i. Further, $\delta_{1,i}$ and $\delta_{2,i}$ are parameters that define when back off control is turned on/off for radio power source i, and $margin_i$ is the additional fractional margin for radio power source i.

According to an embodiment, the priority information p(i) indicates that the radio power source 170a, 170b for which the priority information p(i) is obtained is to have as high part of the total available EIRP as possible. In some aspects, at regular first time instants, it is then checked whether the average power controller is active with a measured average power for a radio power source 170a, 170b that has prioritization level higher than a prioritization threshold, where the check is carried out in priority order. In particular, according to an embodiment the coordinating controller 200 is configured to perform (optional) step S104a as part of S104:

S104a: The coordinating controller 200 checks, at first regular time instances, whether the average power control prevents the radio power source 170a, 170b for which the priority information p(i) is obtained from using as high EIRP budget as possible.

In case a checked radio power source 170a, 170b has its prioritization level above the threshold, the EIRP budget of that radio power source 170a, 170b is increased, while the EIRP budget of any radio power sources 170a, 170b with lower priority levels is correspondingly reduced. In case there is no radio power source 170a, 170b with lower priority, or if the EIRP budget cannot be lowered for the lower priority nodes, no action is taken. That is, according to an embodiment the coordinating controller 200 is configured to perform (optional) steps S104b, S104c as part of S104:

S104b: The coordinating controller 200 checks whether the EIRP budget of any of the remaining radio power sources 170a, 170b with lower priority can be reduced.

S104c: The coordinating controller 200 increases the EIRP budget of the radio power source 170a, 170b for which the priority information p(i) is obtained and correspondingly reducing the EIRP budget of said any of the remaining radio power sources 170a, 170b.

At specific second time instances, the EIRP budget of each radio power source 170a, 170b is reduced/increased, toward the initial value setting. That is, according to an embodiment the coordinating controller 200 is configured to perform (optional) steps S104d, S104e as part of S104:

S104d: The coordinating controller 200 checks, at second regular time instances, whether any of the at least two radio power sources 170a, 170b have, according to the coordinating control information, an EIRP budget that is different from a default EIRP budget.

S104e: The coordinating controller 200 adjusts the EIRP budget of said any of the at least two radio power sources 170a, 170b towards the default EIRP budget.

This creates a counterforce that acts to restore the EIRP budget setting to the initial one, in case re-distribution is no longer needed.

As disclosed above, in some aspects the control is of proportional-derivative (PD) type. That is, according to an embodiment the inner control loop is of PD type. As also disclosed above, in some aspects the control is of derivative (D) type. That is, according to an embodiment the inner control loop is of D type. Thus, in some aspects only differential control is allowed.

In some aspects the average transmission power applied to each site 140, 140a, 140b is limited. Particularly, in some aspects the average transmission power applied to each site 140, 140a, 140b is limited by the scheduler threshold $\gamma(t)$. In more detail, in order to get a smooth behavior of the limiting scheduler threshold to limit the average transmission power, it might be rate controlled. That means that the control signal commands adjustments to the limiter, making it increase or decrease, typically in small steps. The dynamics of the actuator mechanism might therefore be determined to be:

$$\dot{\gamma}(t) = u(t),$$

where $\dot{\gamma}(t)$ is the derivative of the scheduler threshold $\gamma(t)$ and where $u(t)$ is the control signal above expressed in the time domain. The scheduler threshold just expresses a fractional limitation not to use more than a fraction, as given by $\gamma(t)$, of the total resources.

In some aspects the scheduler threshold $\gamma(t)$ is set to its minimum value when the value of average transmission power is larger than a threshold value. In more detail, the maximum value of $\gamma(t)$ is 1 since it is to express a fraction of the maximum amount of scheduler resources. There might also be a need to limit its lower value in order to avoid that the dynamic feedback control mechanism reduces it to an unphysical value below 0. The following scheduler threshold limitation might therefore be applied:

$$\gamma_{low} \leq \gamma(t) \leq 1.$$

In some aspects a supervision mechanism is employed for enabling and disabling the proposed controlling of average transmission power of each site 140, 140a, 140b. That is, in some aspects performing the individual average power control is selectively enabled and disabled. Further, the scheduler threshold $\gamma(t)$ might be set to its maximum value when performing the individual average power control is enabled.

There could be different ways to determine when to enable and disable the control. In some aspects a comparison to threshold values is made in order to determine when to enable and disable the control. In particular, in some aspects, performing the individual average power control is enabled when the value of the average transmission power is larger than a fractional first threshold value $\delta_1$, and performing the individual average power control is disabled when the value of the average transmission power is smaller than a second fractional power threshold value $\delta_2$, where $\delta_2 \leq \delta_1$. In more detail, one scope of the proposed control is to control the averaged transmission power to be below the threshold determined to meet a regulatory requirement. When this is not needed, the proposed control could be disabled, leaving at least one of the sites 140, 140a, 140b to operate without any scheduler limitation. Therefore, according to an example: 1) Enable the control when $\langle P_{tot} \rangle (t) > \delta_1 P_{max,source}$, and set $\gamma(t) = 1$, and 2) Disable the control when $\langle P_{tot} \rangle (t) < \delta_2 P_{max,source}$. In some aspects the values fulfil: $\delta_2 P_{max,source} \leq \langle P_{tot} \rangle^{ref} \leq \delta_1 P_{max,source}$, where $P_{max,source}$ denotes the maximum transmission power per source.

The total transmission power of an antenna array can be measured in the radio, just before the antenna. In one example this is achieved by means of by couplers that measure the radio signal amplitude at each signal path to an antenna element. These amplitudes can then be combined into a total transmission power of the radio, with the antenna gain removed.

Based on such measurements, the averaged transmission power can be constructed by integration as:

$$\langle P_{tot}\rangle(t) = \frac{1}{T} \int_{t-T}^{t} P_{tot}(\tau) d\tau.$$

Here $P_{tot}(t)$ is the total measured power in the radio at time t and T is the averaging time specified in the regulation.

Another example is to replace the measured transmission power by a predicted transmission power using information available in the scheduler or elsewhere in baseband. Such a quantity could be obtained e.g. by summing up the momentary scheduled transmission power as estimated by the fraction of physical resource blocks (PRBs) used at each time instant, over the time T.

Figure 5:
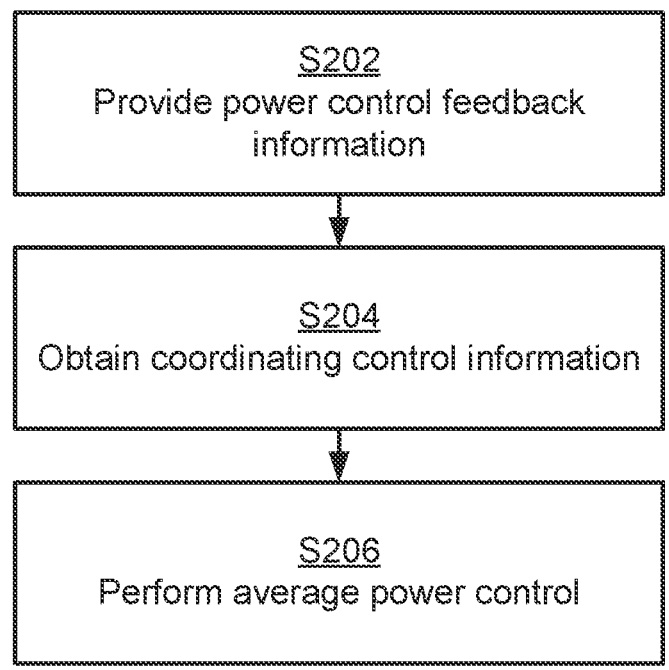

Reference is now made to FIG. 5 illustrating a method for average power control of a radio power source 170a, 170b as performed by the inner controller 300 of the radio power source 170a, 170b according to an embodiment.

As disclosed above, the control of the radio power source 170a, 170b as performed by the coordinating controller 200 is based on information from the radio power source 170a, 170b as provided by the inner controllers 300. Hence the inner controller 300 is configured to perform step S202:

S202: The inner controller 300 provides power control feedback information of the radio power source 170a, 170b to a coordinating controller 200 of a site 140, 140a, 140b, the site 140, 140a, 140b comprising the radio power source 170a, 170b and at least one further radio power source 170a, 170b.

As further disclosed above, control of the radio power source 170a, 170b is by the coordinating controller 300 determined according to an inner control loop and coordinating control information thereof is provided to the inner controllers 300. Hence the inner controller 300 is configured to perform step S204:

S204: The inner controller 300 obtains coordinating control information from a coordinating controller 200, the coordinating control information being determined according to a respective inner control loop for each of the radio power source 170a, 170b and the at least one further radio power source 170a, 170b from the power control feedback information.

Average power control of the radio power source 170a, 170b is then performed. In particular, the inner controller 300 is configured to perform step S206:

S206: The inner controller 300 performs average power control of the radio power source 170a, 170b according to the coordinating control information whereby total average transmission power $\langle P_{tot,i} \rangle (s)$ of the radio power source 170a, 170b is selectively adjusted based on the inner control loop.

The skilled person would understand how to modify and adapt the embodiments, examples and average power control of a radio power source 170a, 170b as performed by the coordinating controller 200 to apply also for the inner controller 300. Detailed description thereof is therefore omitted.

As disclosed above, there may be different ways to obtain the values of total transmission power $P_{tot}(t)$.

Figure 6:
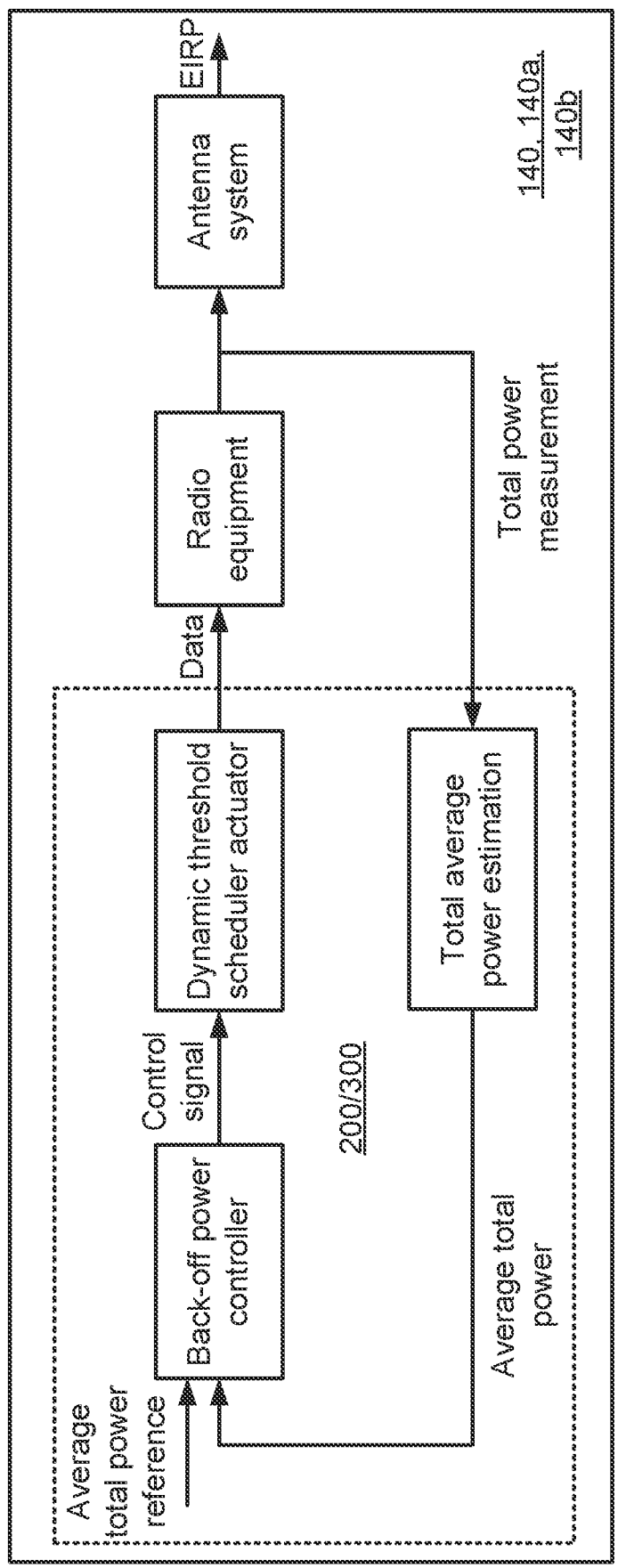

In some aspect the values of total transmission power $P_{tot}(t)$ are measured. FIG. 6 illustrates an architecture of the site 140, 140a, 140b where a measured averaged total power feedback from the antenna system of the site 140, 140a, 140b is used. According to FIG. 6, the site 140, 140a, 140b comprises a back-off power controller, a dynamic threshold scheduler actuator, a total average transmission power estimator, radio equipment and an antenna system (such as an AAS), where the radio equipment and the antenna system are separated from the remaining components over an interface, such as the C2 interface or similar. The back-off power controller, the dynamic threshold scheduler actuator, and the total average transmission power estimator are either part of the coordinating controller 200 or of each inner controller 300. Particularly, in some examples the values of total transmission power are measured at input to the antenna system of the site 140, 140a, 140b. In this respect, the total output power of an antenna system, over all antenna elements of the antenna system, can be measured in the radio equipment, just before the antenna elements of the antenna system. In some examples this can be done by couplers that measure the radio signal amplitude at each signal path to an antenna element. These amplitudes can then be combined into a total output power of the radio equipment, with the antenna gain removed. This quantity is denoted $P_{tot}(t)$.

Figure 7:
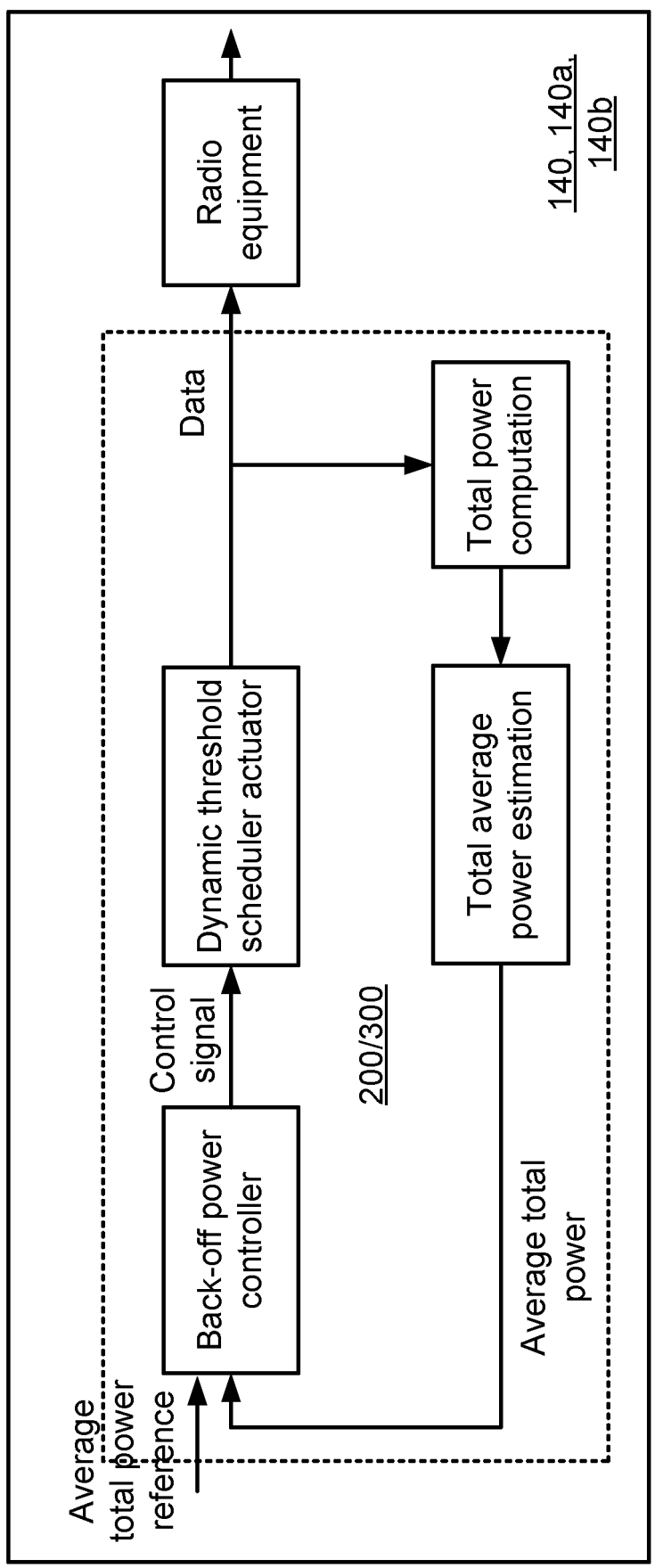

In other aspects the values of total transmission power $P_{tot}(t)$ are predicted. FIG. 7 illustrates an architecture of the site 140, 140a, 140b where a predicted averaged total power is used. According to FIG. 7, the site 140, 140a, 140b comprises a back-off power controller, a dynamic threshold scheduler actuator, a total average transmission power estimator, a total transmission power computer, and radio equipment, where the radio equipment is separated from the remaining components over an interface, such as the C2 interface or similar. The back-off power controller, the dynamic threshold scheduler actuator, the total average transmission power estimator, and the total transmission power computer are either part of the coordinating controller 200 or of each inner controller 300. For example, the values of total transmission power $P_{tot}(t)$ can be predicted using information available in the scheduler or elsewhere in baseband. Such a quantity could be obtained, e.g. by summing up the momentary scheduled power as estimated by the fraction of resources used at each time instant t, over the time T.

Depending on the implementation, different blocks of the control mechanism (as enclosed by the dotted rectangles in FIGS. 6 and 7) of the site 140, 140a, 140b may be implemented by the coordinating controller 200 and each inner controller 300. This could, for example, depend on whether the power control feedback information is given as $P_{tot,i}(t)$, as $\langle P_{tot,i} \rangle (t)$, or as an activity factor, and whether the coordinating control information is given as $u_i(t)$ or as $\langle P_{tot,i} \rangle^{ref}(t)$. It does not matter whether any of these quantities are given in the Laplace domain or in the time domain.

Figure 8:
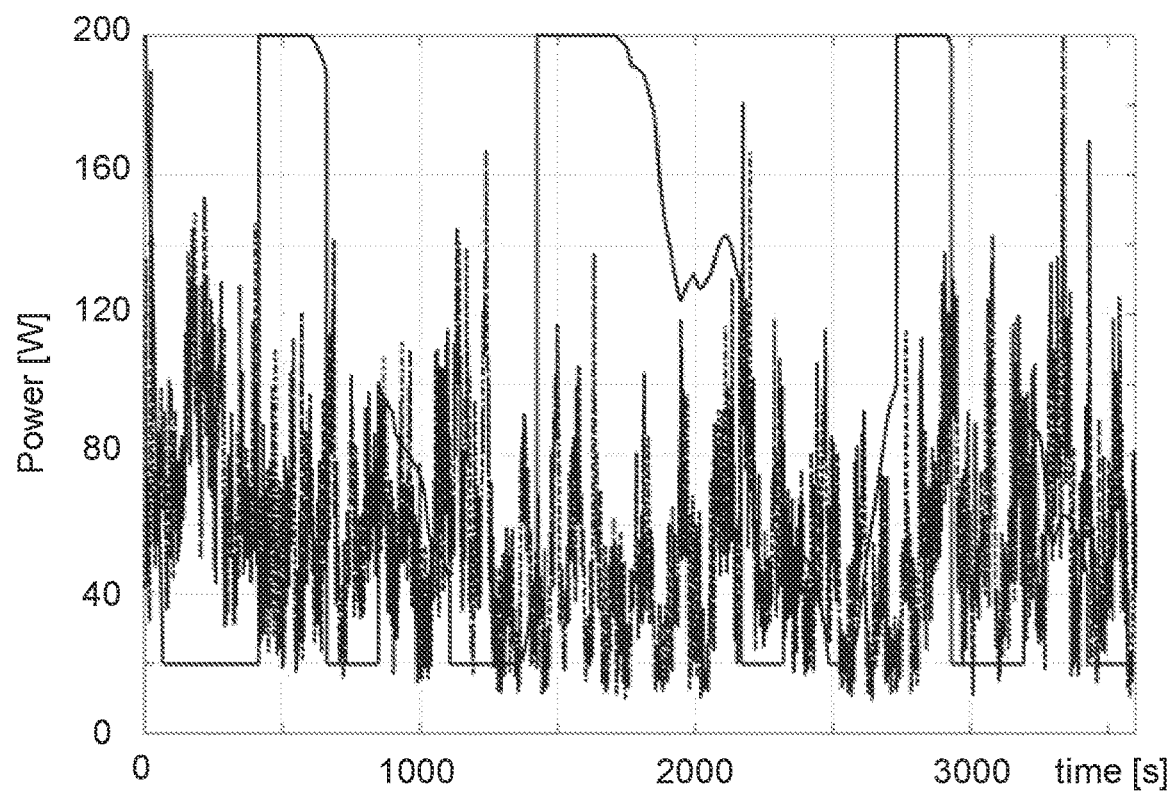
FIGS. 8 and 9 shows simulation results according to embodiments.
Figure 9:
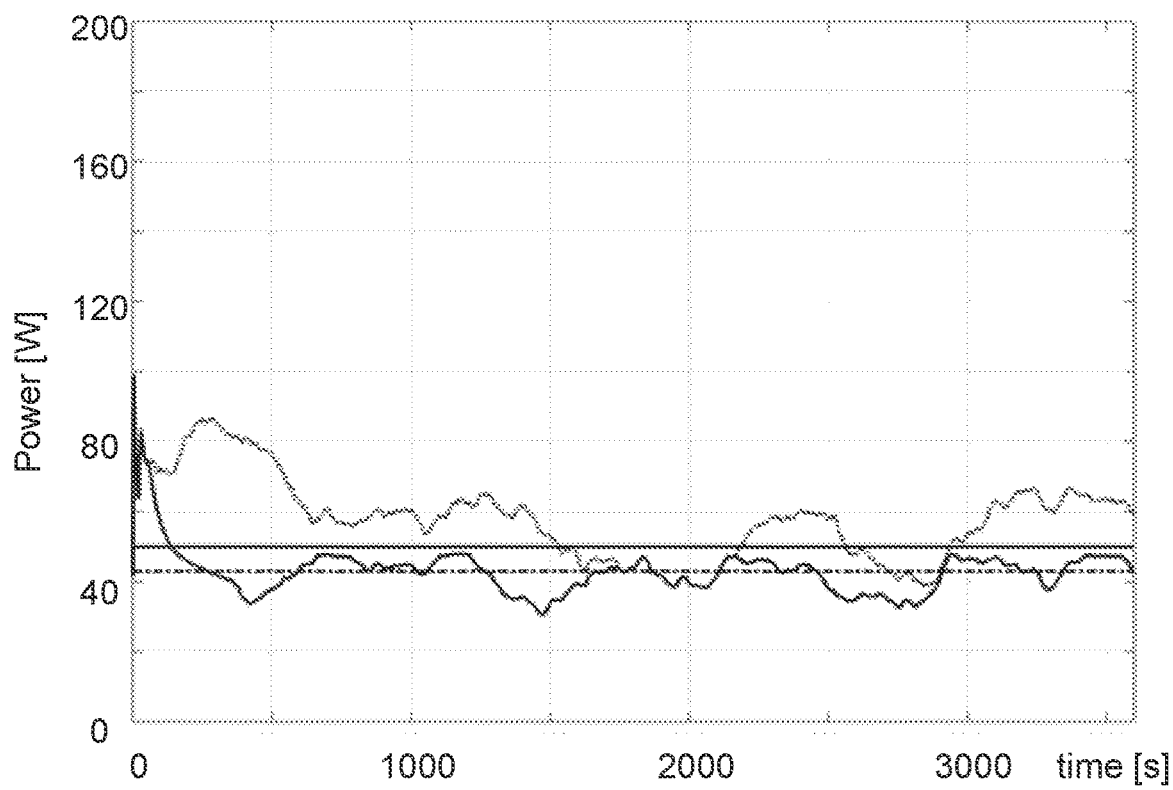

Simulation results of the herein disclosed control of the average power of a radio power source 170a, 170b will now be presented with reference to FIGS. 8 and 9. In those figures, the EIRP normalized with the maximum antenna gain, denoted $G_{max}$, is plotted. In order to illustrate the performance, a reference simulation was performed for the case with an averaging window of 6 minutes using a sampling period of 0.5 seconds. The following typical values were used in the simulations: $P_{max,source}=200$ W, $P_{max,regulatory}=50$ W, $\langle P_{tot} \rangle^{ref}=0.215 \cdot P_{max,site}=43$ W.

FIG. 8 illustrates the uncontrolled momentary power (dotted) and the dynamic threshold (solid).

FIG. 9 illustrates the computed average power limit (solid), the reference power for the back-off controller (dashed-dotted), the uncontrolled average power (dotted), and the controlled average power (solid).

Figure 10:
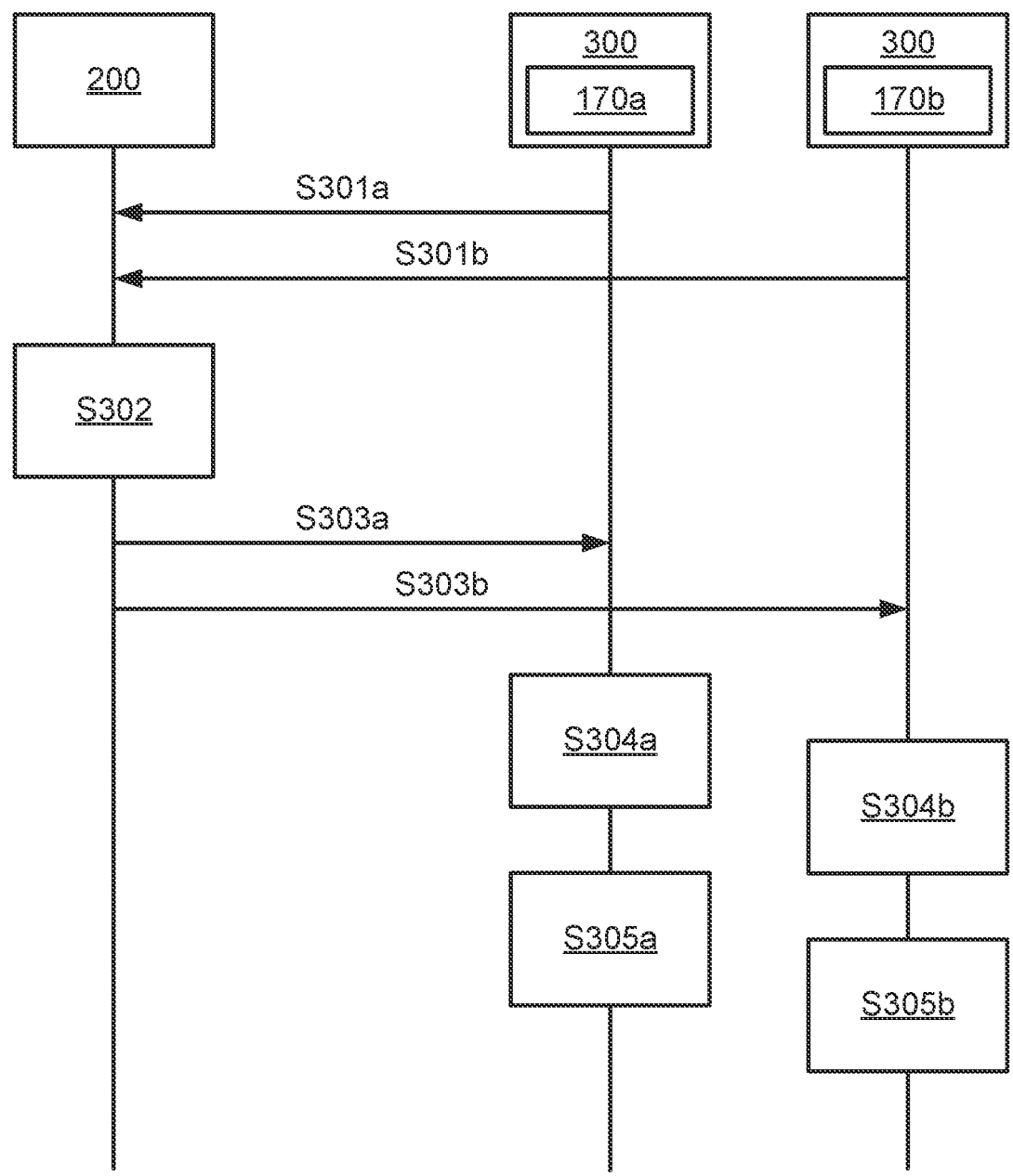
FIG. 10 is a signalling diagram of a method according to an embodiment.

FIG. 10 is a signalling diagram of a method for average EIRP control of two radio power sources 170a, 170b based on at least some of the herein disclosed embodiments. The method is performed by a coordinating controller 200 of a site 140, 140a, 140b, where the site 140, 140a, 140b comprises the two radio power sources 170a, 170b. The skilled person would understand how the method could be generalized to more than two radio power sources 170a, 170b.

S301a, S301b: The inner controller 300 of each radio power source 170a, 170b provides power control feedback information of its radio power source 170a, 170b to the coordinating controller 200.

S302: The coordinating controller 200 determines, according to an inner control loop for each of the at least two radio power sources 170a, 170b, coordinating control information from the power control feedback information.

S303a, S303b: The coordinating controller 200 performs individual average power control of each of the radio power sources 170a, 170b by providing, to each respective inner controller 300, the coordinating control information.

S304a, S304b: The inner controller 300 of each radio power source 170a, 170b performs average power control of its radio power source 170a, 170b according to the coordinating control information whereby total average transmission power $\langle P_{tot,i} \rangle$ (s) of the radio power source 170a, 170b is selectively adjusted based on the inner control loop.

S305a, S305b: The inner controller 300 implements the average power control in the scheduler of its radio power source 170a, 170b.

When the herein disclosed control is implemented in a computer, discretization can be used e.g. with the Euler approximation or with the so called Tustin approximation. Such discretization techniques are as such well known in the art.

Figure 11:
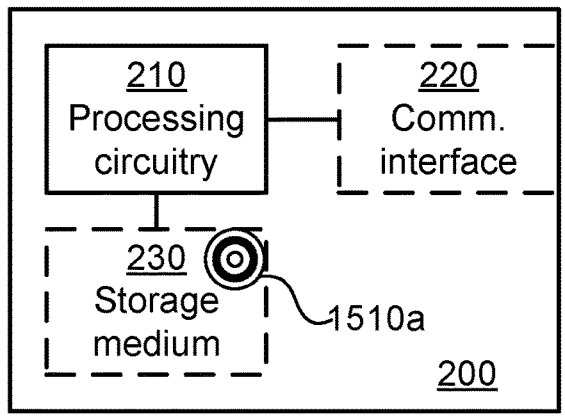
FIG. 11 is a schematic diagram showing functional units of a coordinating controller according to an embodiment.

FIG. 11 schematically illustrates, in terms of a number of functional units, the components of a coordinating controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1510a (as in FIG. 15), e.g. in the form of a storage medium 230. The processing circuitry 210 may further be provided as at least one application specific integrated circuit (ASIC), or field programmable gate array (FPGA).

Particularly, the processing circuitry 210 is configured to cause the coordinating controller 200 to perform a set of operations, or steps, as disclosed above. For example, the storage medium 230 may store the set of operations, and the processing circuitry 210 may be configured to retrieve the set of operations from the storage medium 230 to cause the coordinating controller 200 to perform the set of operations.

The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The coordinating controller 200 may further comprise a communications interface 220 for communications with other entities, functions, nodes, and devices, such as the inner controllers 300. As such the communications interface 220 may comprise one or more transmitters and receivers, comprising analogue and digital components.

The processing circuitry 210 controls the general operation of the coordinating controller 200 e.g. by sending data and control signals to the communications interface 220 and the storage medium 230, by receiving data and reports from the communications interface 220, and by retrieving data and instructions from the storage medium 230. Other components, as well as the related functionality, of the coordinating controller 200 are omitted in order not to obscure the concepts presented herein.

Figure 12:
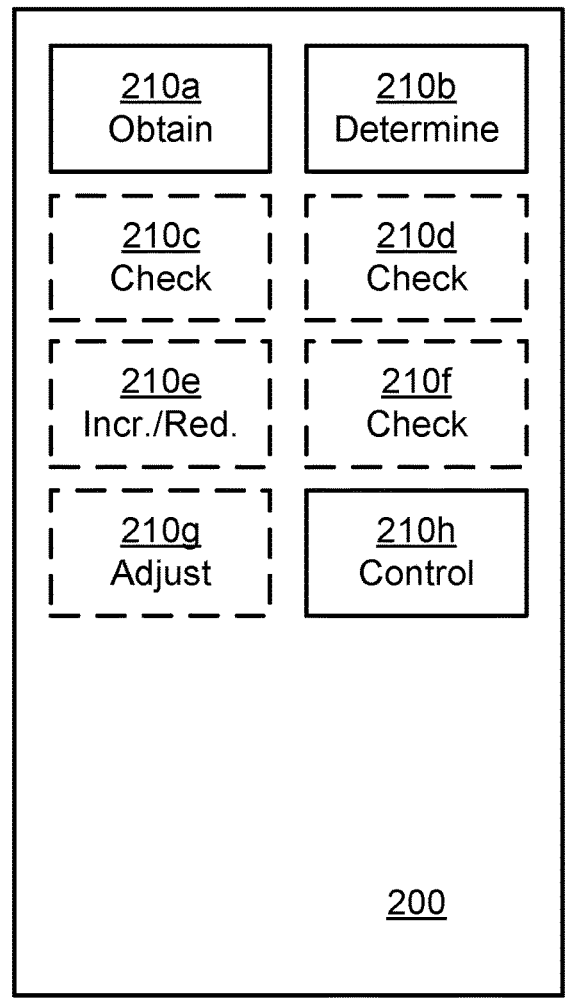
FIG. 12 is a schematic diagram showing functional modules of a coordinating controller according to an embodiment.

FIG. 12 schematically illustrates, in terms of a number of functional modules, the components of a coordinating controller 200 according to an embodiment. The coordinating controller 200 of FIG. 12 comprises a number of functional modules; an obtain module 210a configured to perform step S102, a determine module 210b configured to perform step S104, and a control module 210h configured to perform step S106. The coordinating controller 200 of FIG. 12 may further comprise a number of optional functional modules, such as any of a check module 210C configured to perform step S104a, a check module 210d configured to perform step S104b, a increase/reduce module 210e configured to perform step S104c, a check module 210f configured to perform step S104d, and a adjust module 210g configured to perform step S104e.

In general terms, each functional module 210a-210h may be implemented in hardware or in software. Preferably, one or more or all functional modules 210a-210h may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210h and to execute these instructions, thereby performing any steps of the coordinating controller 200 as disclosed herein.

Figure 13:
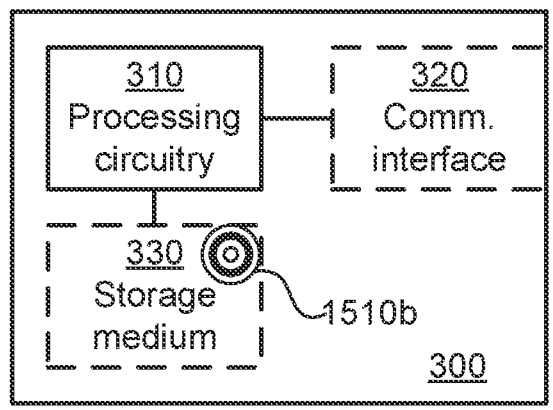
FIG. 13 is a schematic diagram showing functional units of an inner controller according to an embodiment.

FIG. 13 schematically illustrates, in terms of a number of functional units, the components of an inner controller 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1510b (as in FIG. 15), e.g. in the form of a storage medium 330. The processing circuitry 310 may further be provided as at least one application specific integrated circuit (ASIC), or field programmable gate array (FPGA).

Particularly, the processing circuitry 310 is configured to cause the inner controller 300 to perform a set of operations, or steps, as disclosed above. For example, the storage medium 330 may store the set of operations, and the processing circuitry 310 may be configured to retrieve the set of operations from the storage medium 330 to cause the inner controller 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The inner controller 300 may further comprise a communications interface 320 for communications with other entities, functions, nodes, and devices, such as the coordinating controller 200. As such the communications interface 320 may comprise one or more transmitters and receivers, comprising analogue and digital components.

The processing circuitry 310 controls the general operation of the inner controller 300 e.g. by sending data and control signals to the communications interface 320 and the storage medium 330, by receiving data and reports from the communications interface 320, and by retrieving data and instructions from the storage medium 330. Other components, as well as the related functionality, of the inner controller 300 are omitted in order not to obscure the concepts presented herein.

Figure 14:
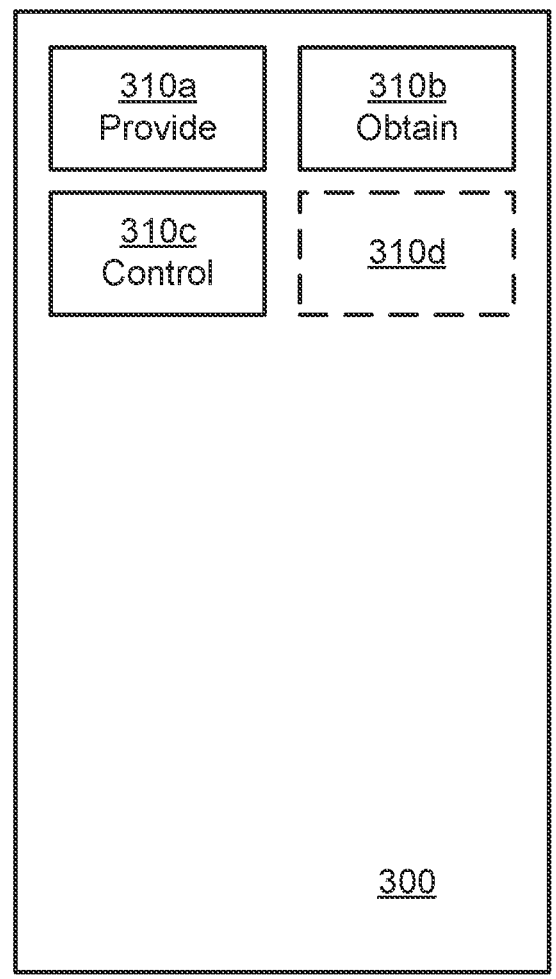
FIG. 14 is a schematic diagram showing functional modules of an inner controller according to an embodiment.

FIG. 14 schematically illustrates, in terms of a number of functional modules, the components of an inner controller 300 according to an embodiment. The inner controller 300 of FIG. 14 comprises a number of functional modules; a provide module 310a configured to perform step S202, an obtain module 310b configured to perform step S204, and a control module 310c configured to perform step S206. The inner controller 300 of FIG. 14 may further comprise a number of optional functional modules, such symbolized by module 310d. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the inner controller 300 as disclosed herein.

Each of the coordinating controller 200 and inner controller 300 may be provided as a standalone device or as a part of a respective at least one further device. For example, the coordinating controller 200 and the inner controller 300 may be provided in a node of the radio access network or in a node of the core network. Alternatively, functionality of the coordinating controller 200 and the inner controller 300 may be distributed between at least two devices, or nodes. These at least two nodes, or devices, may either be part of the same network part (such as the radio access network or the core network) or may be spread between at least two such network parts. In general terms, the functionality of the coordinating controller 200 may be implemented in one of the sites 140, 140a, 104b or even in the core network whereas the functionality of the inner controller 300 may be implemented in each of the sites 140, 10a, 10b.

Thus, a first portion of the instructions performed by the coordinating controller 200 and the inner controller 300 may be executed in a respective first device, and a second portion of the instructions performed by the coordinating controller 200 and the inner controller 300 may be executed in a respective second device; the herein disclosed embodiments are not limited to any particular number of devices on which the instructions performed by the coordinating controller 200 and the inner controller 300 may be executed. Hence, the methods according to the herein disclosed embodiments are suitable to be performed by a coordinating controller 200 and/or inner controller 300 residing in a cloud computational environment. Therefore, although a single processing circuitry 210, 310 is illustrated in FIGS. 11 and 13 the processing circuitry 210, 310 may be distributed among a plurality of devices, or nodes. The same applies to the functional modules 210a-210h, 310a-310d of FIGS. 12 and 14 and the computer programs 1520a, 1520b of FIG. 15.

Figure 15:
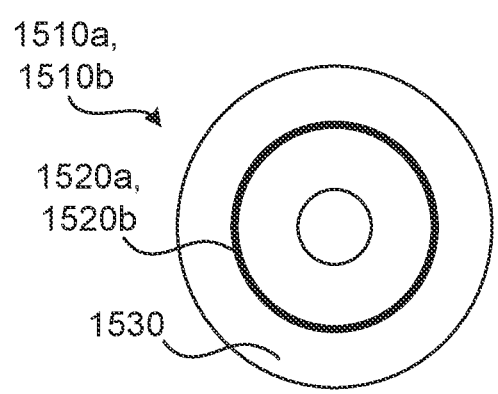
FIG. 15 shows one example of a computer program product comprising computer readable means according to an embodiment.

FIG. 15 shows one example of a computer program product 1510a, 1510b comprising computer readable means 1530. On this computer readable means 1530, a computer program 1520a can be stored, which computer program 1520a can cause the processing circuitry 210 and thereto operatively coupled entities and devices, such as the communications interface 220 and the storage medium 230, to execute methods according to embodiments described herein. The computer program 1520a and/or computer program product 1510a may thus provide means for performing any steps of the coordinating controller 200 as herein disclosed. On this computer readable means 1530, a computer program 1520b can be stored, which computer program 1520b can cause the processing circuitry 310 and thereto operatively coupled entities and devices, such as the communications interface 320 and the storage medium 330, to execute methods according to embodiments described herein. The computer program 1520b and/or computer program product 1510b may thus provide means for performing any steps of the inner controller 300 as herein disclosed.

In the example of FIG. 15, the computer program product 1510a, 1510b is illustrated as an optical disc, such as a CD (compact disc) or a DVD (digital versatile disc) or a Blu-Ray disc. The computer program product 1510a, 1510b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1520a, 1520b is here schematically shown as a track on the depicted optical disk, the computer program 1520a, 1520b can be stored in any way which is suitable for the computer program product 1510a, 1510b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for average effective isotropic radiated power (EIRP) control of at least two radio power sources, the method being performed by a coordinating controller of a site, the site comprising the at least two radio power sources, the method comprising:
obtaining, from a respective inner controller of each of the at least two radio power sources, power control feedback information;
determining, according to an inner control loop for each of the at least two radio power sources, coordinating control information from the power control feedback information; and
performing individual average power control of each of the at least two radio power sources by providing, to each respective inner controller, the coordinating control information, whereby total average transmission power $\langle P_{tot,i} \rangle$ (s) of each of the at least two radio power sources is selectively adjusted based on the inner control loop.

2. The method of claim 1, wherein the coordinating control information specifies a respective reference value for time average transmission power for each of the at least two radio power sources.

3. The method of claim 1, wherein the power control feedback information is given as a value of momentary transmission power $P_{tot,i}(s)$ of each of the at least two radio power sources.

4. The method of claim 1, wherein the power control feedback information is given as a value of the total average transmission power $\langle P_{tot,i} \rangle$ (s) of each of the at least two radio power sources.

5. The method of claim 1, wherein the power control feedback information is given as a time fraction value representing how long the inner controller of each of the at least two radio power sources is active within a given time frame.

6. The method of claim 1, wherein the coordinating control information is given as a direct control signal $u_i(s)$ for each of the at least two radio power sources.

7. The method of claim 1, wherein the coordinating control information is given as a reference value $\langle P_{tot,i} \rangle^{ref}(S)$ of time-varying transmission power for each of the at least two radio power sources.

8. The method of claim 1, wherein the individual average power control of each of the at least two radio power sources corresponds to transmission power for an individual carrier, node, cell, base station, or radio access technology of each radio power source.

9. The method of claim 1, wherein the power control feedback information is obtained at medium access control protocol layer and the coordinating control information is provided at medium access control protocol layer.

10. The method of claim 1, wherein coordinating control information is determined using a dynamic input-output relation,
wherein the dynamic input-output relation at a given time t is given by:

$$\begin{cases} \dot{x} = f(x, a) \\ b = g(x) \end{cases},$$

where $f$ and $g$ are vector-valued functions, where a represent a value of the power control feedback information, where b represents a value of the coordinating control information, and where x is an internal state of the coordinating controller.

11. The method of claim 1, wherein the power control feedback information obtained from at least one of the inner controllers comprises priority information p(i), and wherein the coordinating control information is determined based on the priority information p(i),
wherein the priority information p(i) indicates that the radio power source for which the priority information p(i) is obtained is to have as high EIRP budget as possible, and wherein determining the coordinating control information comprises:
checking, at first regular time instances, whether the average power control prevents the radio power source for which the priority information p (i) is obtained from using as high EIRP budget as possible; and if so:
checking whether the EIRP budget of any of the remaining radio power sources with lower priority can be reduced; and if so:
increasing the EIRP budget of the radio power source for which the priority information p(i) is obtained and correspondingly reducing the EIRP budget of said any of the remaining radio power sources.

12. The method of claim 1, wherein determining the coordinating control information comprises:
checking, at second regular time instances, whether any of the at least two radio power sources have, according to the coordinating control information, an EIRP budget that is different from a default EIRP budget; and if so:
adjusting the EIRP budget of said any of the at least two radio power sources towards the default EIRP budget.

13. A non-transitory computer-readable storage medium having stored thereon a computer program comprising instructions that, when executed by a computer, cause the computer to perform the method of claim 1.

14. A method for average power control of a radio power source, the method being performed by an inner controller of the radio power source, the method comprising:
providing power control feedback information of the radio power source to a coordinating controller of a site, the site comprising the radio power source and at least one further radio power source;
obtaining coordinating control information from a coordinating controller, the coordinating control information being determined according to a respective inner control loop for each of the radio power source and the at least one further radio power source from the power control feedback information; and
performing average power control of the radio power source according to the coordinating control information whereby total average transmission power $\langle P_{tot,i} \rangle (s)$ of the radio power source is selectively adjusted based on the inner control loop.

15. A coordinating controller of a site for average effective isotropic radiated power (EIRP) control of at least two radio power sources, the site comprising the at least two radio power sources, the coordinating controller comprising processing circuitry, the processing circuitry being configured to cause the coordinating controller to:
obtain, from a respective inner controller of each of the at least two radio power sources, power control feedback information;
determine, according to an inner control loop for each of the at least two radio power sources, coordinating control information from the power control feedback information; and
perform individual average power control of each of the at least two radio power sources by providing, to each respective inner controller, the coordinating control information, whereby total average transmission power $\langle P_{tot,i} \rangle (s)$ of each of the at least two radio power sources is selectively adjusted based on the inner control loop.

16. An inner controller of a radio power source for average power control of the radio power source, the inner controller comprising processing circuitry, the processing circuitry being configured to cause the inner controller to:
provide power control feedback information of the radio power source to a coordinating controller of a site, the site comprising the radio power source and at least one further radio power source;
obtain coordinating control information from a coordinating controller, the coordinating control information being determined according to a respective inner control loop for each of the radio power source and the at least one further radio power source from the power control feedback information; and
perform average power control of the radio power source according to the coordinating control information whereby total average transmission power $\langle P_{tot,i} \rangle (s)$ of the radio power source is selectively adjusted based on the inner control loop.

* * * * *